United States Patent
Guo et al.

(10) Patent No.: US 9,337,979 B2
(45) Date of Patent: May 10, 2016

(54) FEEDBACK CAPABILITY ENHANCEMENT USING REFERENCE SYMBOL RADIO RESOURCE SELECTION

(71) Applicant: Telefonaktiebolaget L M Ericsson (publ), Stockholm (SE)

(72) Inventors: Shiguang Guo, Kanata (CA); Xiaodong Shi, Ottawa (CA); Jiandong Zhuang, Nepean (CA); Edward Mah, Kanata (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 193 days.

(21) Appl. No.: 14/017,630

(22) Filed: Sep. 4, 2013

(65) Prior Publication Data

US 2014/0064213 A1    Mar. 6, 2014

Related U.S. Application Data

(60) Provisional application No. 61/696,521, filed on Sep. 4, 2012.

(51) Int. Cl.
  *H04W 4/00*    (2009.01)
  *H04L 5/00*    (2006.01)
  *H04W 72/04*   (2009.01)

(52) U.S. Cl.
  CPC ............ *H04L 5/0048* (2013.01); *H04W 72/04* (2013.01)

(58) Field of Classification Search
  CPC .................................................. H04W 28/04
  USPC ........................................................ 370/329
  See application file for complete search history.

(56) References Cited

U.S. PATENT DOCUMENTS

| 2011/0075752 A1* | 3/2011 | Zheng et al. ............... 375/267 |
| 2012/0033571 A1* | 2/2012 | Shimezawa et al. ........ 370/252 |
| 2013/0182674 A1* | 7/2013 | Lunttila et al. ............. 370/329 |

FOREIGN PATENT DOCUMENTS

| WO | 2012022368 A1 | 2/2012 |
| WO | 2012108804 A1 | 8/2012 |

OTHER PUBLICATIONS

Written Opinion of the International Preliminary Examining Authority for PCT/IB2013/058289, mailed Aug. 6, 2014, 4 pages.
International Preliminary Report on Patentability for PCT/IB2013/058289 mailed Nov. 21, 2014, 6 pages.

(Continued)

*Primary Examiner* — Samina Choudhry
(74) *Attorney, Agent, or Firm* — Withrow & Terranova, PLLC (57) ABSTRACT

Feedback information is conveyed between a wireless device and a base station in a cellular communications network via selection and detection of radio resources utilized for an uplink reference signal transmitted from a wireless device to a base station. In this manner, additional feedback information may be sent from the wireless device to the base station without sacrificing any bandwidth available for data transfer between the wireless device and the base station. The radio resources utilized for the uplink reference signal may include cyclic shift and/or time and frequency resources. The uplink reference signal may be an uplink sounding reference signal for a long term evolution network (LTE), or its evolution, such as LTE-Advanced.

39 Claims, 11 Drawing Sheets

(56) References Cited

OTHER PUBLICATIONS

Author Unknown, "Technical Specification Group Radio Access Network; Evolved Universal Terrestrial Radio Access (E-UTRA); Physical Channels and Modulation (Release 11)," 3GPP, Technical Specification 36.211, 3GPP Organizational Partners, Dec. 2012, Version 11.1.0, 108 pages.

Author Unknown, "Technical Specification Group Radio Access Network; Evolved Universal Terrestrial Radio Access (E-UTRA); Physical layer procedures (Release 11)," 3GPP, Technical Specification 36.213, 3GPP Organizational Partners, Dec. 2012, Version 11.1.0, 160 pages.

Holma, H. et al., "LTE for UMTS-OFDMA and SC-FDMA Based Radio Access," (book), John Wiley & Sons, Ltd., 2009, West Sussex, UK, 450 pages.

International Search Report and Written Opinion for PCT/IB2013/058289 mailed Jan. 30, 2014, 9 pages.

\* cited by examiner

| a(0) | a(1) | ... | a(m) | a(m+1) | ... | a(n-1) |
|------|------|-----|------|--------|-----|--------|

FIG. 4A

| a(n-m) | a(n-m+1) | ... | a(n-1) | a(0) | ... | a(n-m-1) |
|--------|----------|-----|--------|------|-----|----------|

FIG. 4B

| a(n-2m) | a(n-2m+1) | ... | a(n-1) | a(0) | ... | a(n-2m-1) |
|---------|-----------|-----|--------|------|-----|-----------|

| FEEDBACK BITS | SRS1 | SRS2 |
|---|---|---|
| 000 | CS A | NULL |
| 001 | CS B | NULL |
| 010 | NULL | CS A |
| 011 | NULL | CS B |
| 110 | CS A | CS B |
| 101 | CS B | CS A |
| 111 | CS A | CS A |
| 100 | CS B | CS B |

*FIG. 6A*

| FEEDBACK BITS | SRS1 |
|---|---|
| 0 | CS A |
| 1 | CS B |

*FIG. 6B*

| FEEDBACK BITS | SRS1 | SRS2 |
|---|---|---|
| 010 | CS A, COMB EVEN | CS B, COMB EVEN |
| 001 | CS B, COMB EVEN | CS A, COMB EVEN |
| 011 | CS A, COMB EVEN | CS A, COMB EVEN |
| 000 | CS B, COMB EVEN | CS B, COMB EVEN |
| 110 | CS A, COMB ODD | CS B, COMB ODD |
| 101 | CS B, COMB ODD | CS A, COMB ODD |
| 111 | CS A, COMB ODD | CS A, COMB ODD |
| 100 | CS B, COMB ODD | CS B, COMB ODD |

FEEDBACK CAPABILITY ENHANCEMENT USING REFERENCE SYMBOL RADIO RESOURCE SELECTION

RELATED APPLICATIONS

This application claims the benefit of provisional patent application Ser. No. 61/696,521, filed Sep. 4, 2012, the disclosure of which is hereby incorporated herein by reference in its entirety.

FIELD OF THE DISCLOSURE

The present disclosure relates to methods of providing feedback between a wireless device and a base station in a wireless communications network.

BACKGROUND

Feedback between a wireless device and a base station is an invaluable mechanism for increasing the reliability and efficiency of a wireless communications network. Robust feedback mechanisms allow for a reliable communication link between a wireless device and a base station, while simultaneously minimizing the amount of power used to transmit signals between the two.

Some common feedback mechanisms for cellular communications networks include acknowledge/negative-acknowledge (ACK/NACK) messages and channel state information (CSI). ACK/NACK messages may be sent based on whether certain data was received by either a wireless device or a base station in the cellular communications network. ACK/NACK messages may be used to support downlink hybrid automatic repeat request (HARQ) error correction in the cellular communications network, which uses error-correcting coding to provide a more reliable communication between a base station and one or more wireless devices in the cellular communications network.

CSI refers to one or more properties of a communication link the cellular communications network. CSI may include a pre-coding matrix indicator (PMI), a rank indicator (RI), and a channel quality indicator (CQI), and may be used to support a downlink scheduling mechanism for resource allocation, link adaptation, the determination of pre-coding vectors, etc. The accuracy and frequency of CSI is critical to the downlink performance of the cellular communications network. Accurate CSI can be used by a base station to determine an appropriate pre-coding vector for transmit diversity, beam-forming, multiple-input/multiple-output (MIMO), etc.

In Long Term Evolution (LTE) cellular communications networks, advanced transmission schemes such as downlink multi-user MIMO and coordinated multipoint (CoMP) are used to increase system capacity and cell-edge performance. In addition, carrier aggregation provides more component carriers for a single wireless device to increase throughput of the device. While the use of advanced transmission schemes may improve the overall throughput of a cellular communications network, such transmission schemes often require additional feedback mechanisms in order to properly function.

Currently, feedback information is sent in uplink transmissions via a physical uplink control channel (PUCCH) and a physical uplink shared channel (PUSCH). For feedback information transmitted via the PUCCH, a periodic scheme is used wherein feedback information is sent in a predefined transmission time interval (TTI). Feedback information transmitted via PUSCH is also transmitted periodically.

Generally, uplink radio resources need to be partitioned between data transmission and wireless device feedback. In other words, there is a trade-off between the total throughput of a wireless device and the amount of feedback used in the cellular communications network. One solution to this problem is to quantize feedback information from a wireless device before transmitting it. While this reduces the number of bits of feedback information, it comes at the cost of reduced performance. The reduced performance, as a result of using quantized feedback, may render the network incapable of supporting the advanced transmission schemes offered in an LTE cellular communications network.

Accordingly, there is an ongoing need for additional bandwidth for feedback information in a cellular communications network without a reduction in the bandwidth allocated for user data.

SUMMARY

The present disclosure relates to improved feedback mechanisms between a wireless device and a base station in a cellular communications network. According to one embodiment, feedback information is conveyed via selection and detection of radio resources utilized for an uplink reference signal transmitted from a wireless device to a base station. In this manner, additional feedback information may be sent from the wireless device to the base station without sacrificing any bandwidth available for data transfer between the wireless device and the base station. The radio resources utilized for the uplink reference signal may include cyclic shift and/or time and frequency resources. In one embodiment, the uplink reference signal is an uplink Sounding Reference Signal (SRS) for a Long Term Evolution (LTE) cellular communications network.

According to one embodiment, the feedback information comprises a mobility status of the wireless device. For example, the feedback information may indicate a high, medium, low, or static mobility status of the wireless device. According to an additional embodiment, the feedback information comprises position information for the wireless device. For example, the feedback information may indicate an angle of wireless device movement relative to the base station.

According to one embodiment, the wireless device includes a radio subsystem and a processing subsystem. The processing subsystem is associated with the radio subsystem and is configured to select one of multiple sets of radio resources for transmission of an uplink reference signal, wherein the selected set of radio resources is mapped to feedback information that the wireless device desires to convey to a base station. The processing subsystem of the wireless device is further configured to transmit the uplink reference signal to the base station via the radio subsystem using the selected set of radio resources to thereby convey the feedback information to the base station.

According to one embodiment, the base station includes a radio subsystem and a processing subsystem. The processing subsystem is associated with the radio subsystem and is configured to receive an uplink reference signal from a wireless device and derive feedback information from the wireless device based on radio resources used by the uplink reference signal.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1:
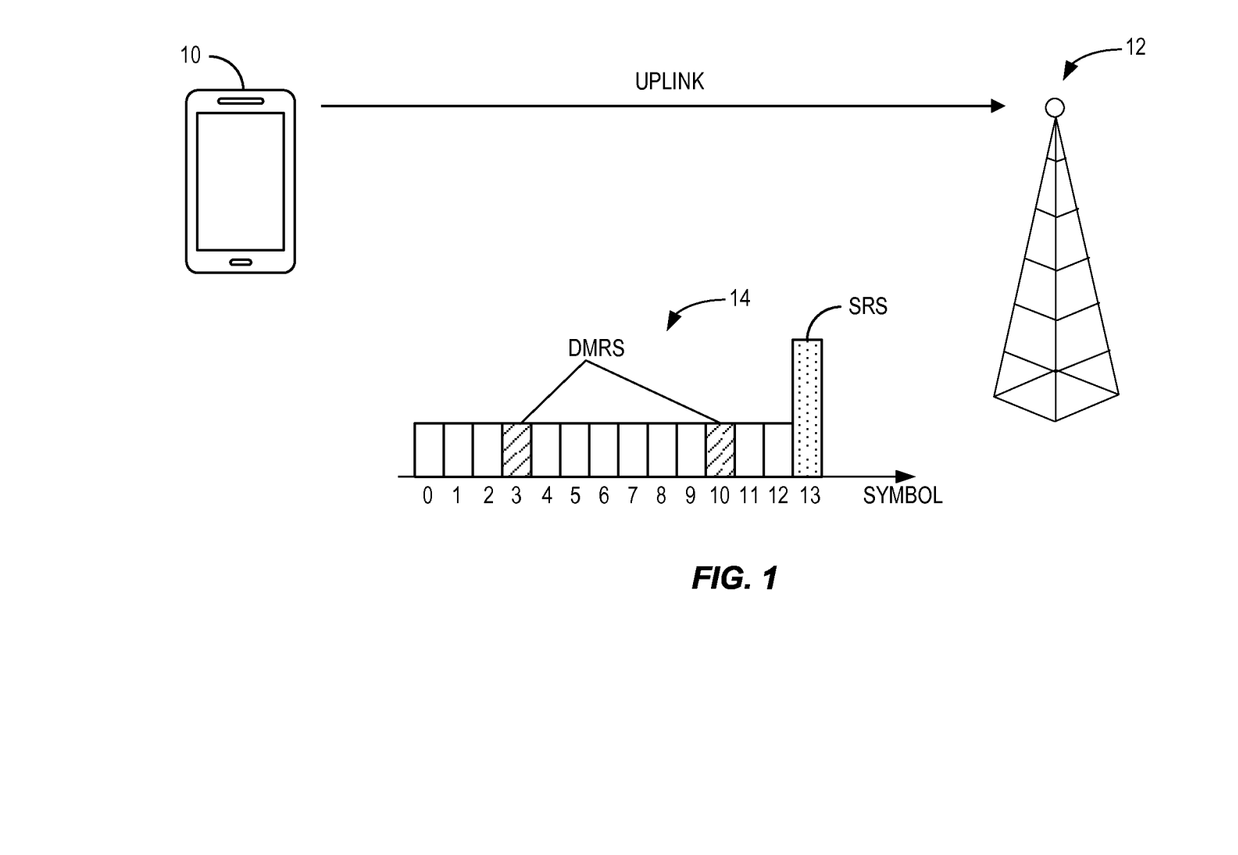
FIG. 1 is a diagram showing the transmission of an uplink Sounding Reference Signal (SRS) from a wireless device to a base station in a cellular communications network.

Turning now to FIG. 1, a diagram showing transmission of an uplink Sounding Reference Signal (SRS) from a wireless device 10 to a base station 12 is shown according to one embodiment of the present disclosure. In one preferred embodiment, the base station 12 is a base station in a Long Term Evolution (LTE) cellular communications network. As such, terminology related to LTE is sometimes used herein. However, the concepts disclosed herein are not limited to LTE and may be used in other types of cellular communications networks (e.g., WiMax). Further, the concepts disclosed herein may be used in LTE evolutionary networks, such as LTE Advanced. In an LTE cellular communications network, the uplink SRS may be transmitted as part of an uplink subframe 14 including two demodulation reference signals (DMRS), and may occur every subframe or every N subframes. Conventional uplink SRS do not convey information or data from the wireless device 10. Instead, conventional uplink SRS are merely arbitrary reference signals which may indicate the state of the uplink connection based on characteristics of the uplink SRS as it arrives at the base station 12. Uplink SRS may be used by the base station 12 to estimate parameters such as uplink channel state, uplink timing estimation, and downlink channel conditions (assuming downlink/uplink channel reciprocity).

According to one embodiment of the present disclosure, multiple sets of radio resources are assigned to the wireless device 10 for transmission of uplink SRS. Each set of radio resources includes one or more radio resources that are different from one another. Further, each set of radio resources is mapped to different feedback information. In order to convey desired feedback information to the base station 12, the wireless device 10 then selects a corresponding set of radio resources that is mapped to the desired feedback information. The wireless device 10 then transmits the uplink SRS using the selected set of radio resources. Upon arrival of the SRS at the base station 12, the base station 12 determines the feedback information conveyed by the wireless device 10 based on the radio resources used to transmit the SRS and known radio resources to feedback information mapping. Accordingly, the functionality of the SRS feedback mechanism is maintained while simultaneously creating an additional feedback mechanism between the wireless device 10 and the base station 12. By creating the additional feedback mechanism without sacrificing available bandwidth for data exchange between the wireless device 10 and the base station 12, the performance of both the wireless device 10 and the base station 12 is improved.

As will be appreciated by those of ordinary skill in the art, the wireless device 10 may be a mobile phone, a cellular phone, a Personal Digital Assistant (PDA) equipped with radio communication abilities, a smart phone, a laptop equipped with an internal or external mobile broadband modem, a portable electronic radio communication device, or the like. The base station 12 may be, for example, an enhanced Node B (eNB) for use in a Long Term Evolution (LTE) network.

Although the present disclosure refers to implementing feedback mechanisms in an uplink SRS used in a LTE network, those of ordinary skill in the art will readily appreciate that the principles of the present disclosure may be applied to any feedback mechanism in which an arbitrary reference signal is used to ascertain feedback information between a wireless device and a base station.

Figure 2:
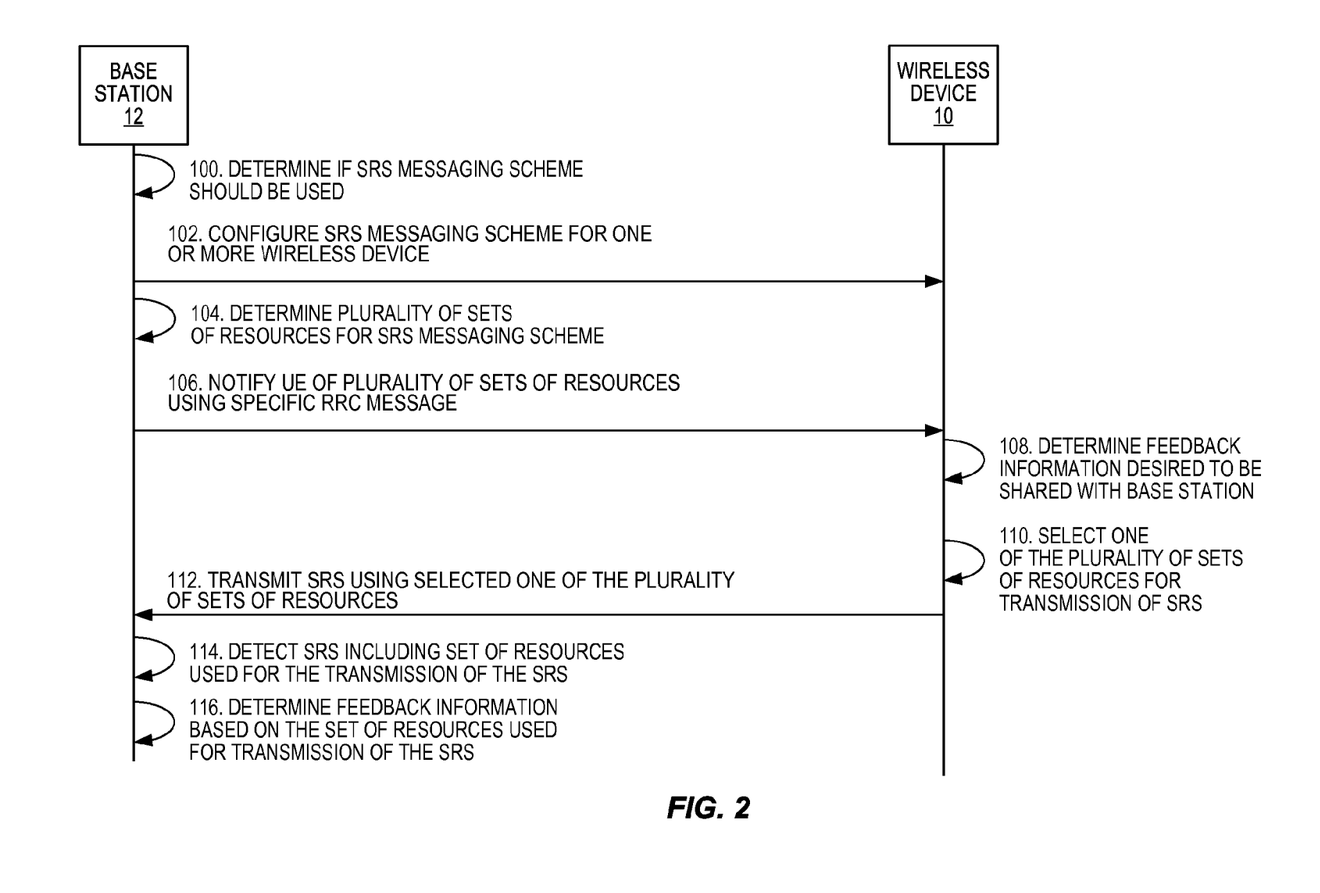
FIG. 2 is a network diagram showing the operation of a base station and a wireless device to provide a feedback mechanism utilizing uplink SRS according to one embodiment of the present disclosure.

FIG. 2 is a network diagram showing the operation of an SRS feedback mechanism according to one embodiment of the present disclosure. First, the base station 12 determines if an SRS messaging scheme should be used (step 100). This may involve, for example, determining the radio resources available for transmission of an SRS in the current network environment as well as the number of devices in communication with the base station 12 and the available bandwidth for communication. Next, assuming that SRS messaging is desired, the base station 12 configures the SRS messaging scheme for the wireless device 10 (step 102). This may involve, for example, sending a message to the wireless device 10 indicating that the SRS messaging scheme should be used.

The base station 12 then determines multiple of sets of radio resources that are allocated to the wireless device 10 for transmission of uplink SRS according to the current SRS messaging scheme (step 104). This may involve, for example, determining the radio resources available for transmission of the SRS in the current network environment, the number of devices in communication with the base station 12, the available bandwidth for communication, and the desired amount of feedback between the wireless device 10 and the base station 12. Notably, each set of radio resources is mapped to different feedback information from the wireless device 10. The feedback information can be any type of feedback information. In one exemplary embodiment, the feedback information is a mobility status of the wireless device 10. In an additional exemplary embodiment, the feedback information is location information about the wireless device 10.

Next, the base station 12 transmits information that identifies the sets of radio resources and the mapping between the feedback information and the sets of radio resources to the wireless device 10 using a specific radio resource control (RRC) message (step 106). Sometime thereafter, the wireless device 10 determines feedback information that it wishes to convey to the base station 12 (step 108). The wireless device 10 then selects a set of radio resources that corresponds to the feedback information that it wishes to convey to the base station (step 110). Next, the wireless device 10 transmits the uplink SRS using the selected set of radio resources (step 112).

Once the SRS is received at the base station 12, the base station 12 detects the uplink SRS including the set of radio resources used to transmit the SRS (step 114). Finally, the base station 12 determines or derives feedback information from the set of radio resources used for transmission of the uplink SRS and the known mapping between feedback information and the sets of radio resources allocated to the wireless device 10 (step 116). This may involve, for example, comparing the set of radio resources used for transmission of the uplink SRS to a look-up table storing the mapping of the sets of radio resources to particular feedback information.

Note that the process depicted in FIG. 2 may be repeated between any number of wireless devices and base stations in order to implement the SRS messaging scheme. Also, while the steps of FIG. 2 are illustrated in a particular order, the steps may be performed in any desired order unless a specific order is explicitly required. Further, although nine steps are shown to effectuate the SRS feedback mechanism described in FIG. 2, those of ordinary skill in the art will appreciate that the present SRS feedback mechanism may be implemented in fewer or more steps depending on the particular implementation.

Figure 3:
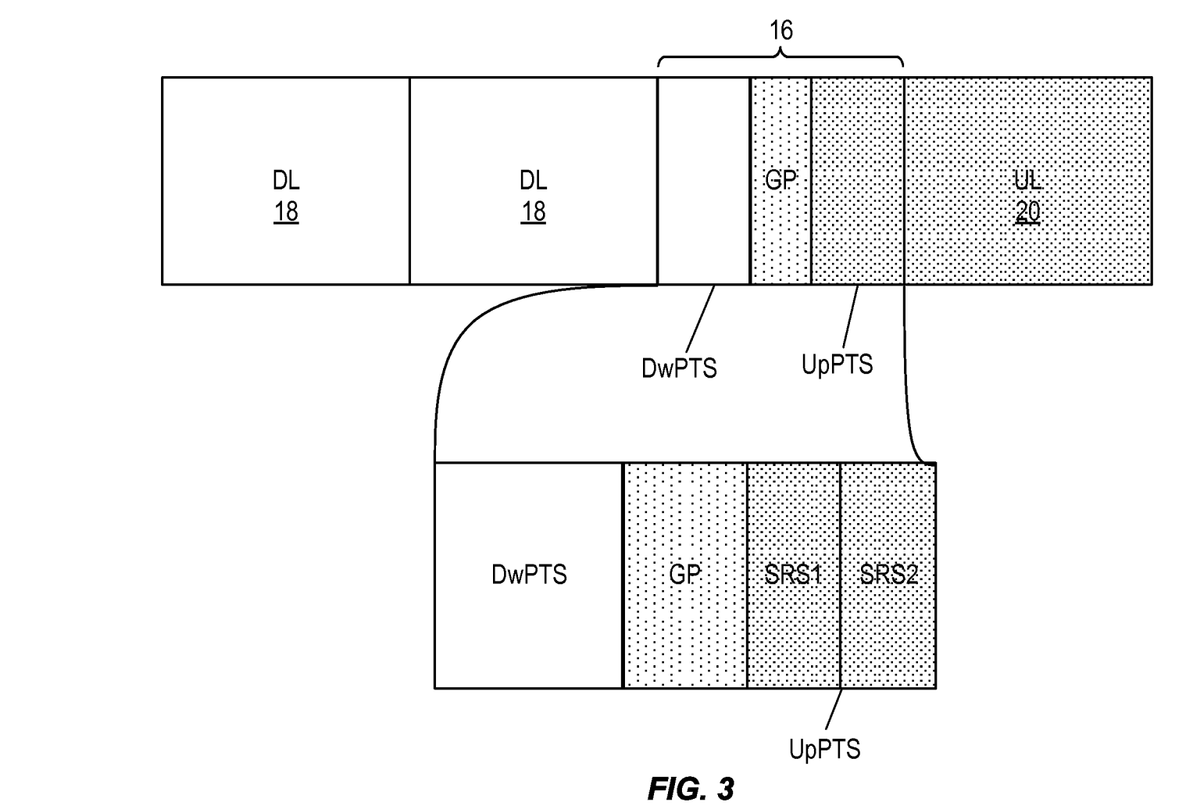
FIG. 3 is a diagram showing the placement of a sounding reference signal within a special subframe in a Time Division Duplexing (TDD) Long Term Evolution (LTE) system.

FIG. 3 is a diagram showing the placement of the uplink SRS within a special subframe 16 in a Time Division Duplexing (TDD) LTE cellular communications network. As shown in FIG. 3, the special subframe 16 is located between a downlink subframe 18 and an uplink subframe 20 as part of a larger network frame (not shown). The special subframe 16 includes a downlink pilot time slot DwPTS, a guard period GP, and an uplink pilot time slot UpPTS. The SRS occupies the UpPTS, and is divided into a first SRS transmission slot SRS1 and a second SRS transmission slot SRS2. As discussed in further detail below, in one embodiment, a wireless device is allocated multiple different sets of radio resources within SRS1 and/or SRS2 in order to enable the wireless device to convey feedback information to the base station by utilizing a set of the radio resources mapped to the desired feedback information.

Figure 4A:
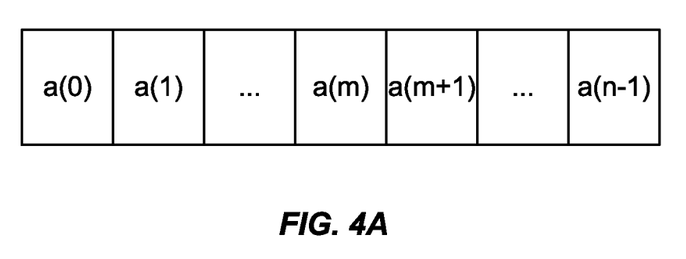
FIGS. 4A-4C are diagrams showing different cyclic shifts for an uplink SRS sequence.
Figure 4B:
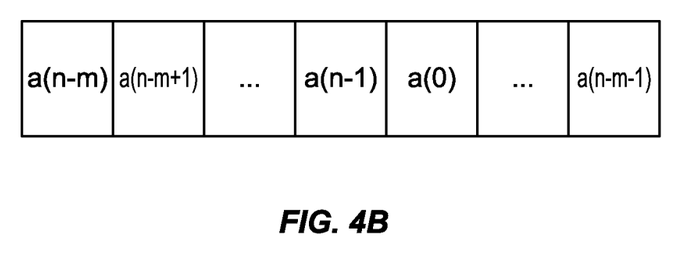
Figure 4C:
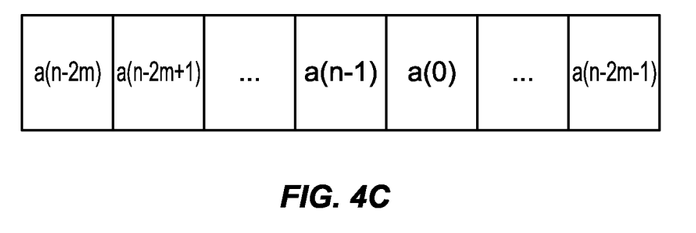

As discussed above, each of the sets of radio resources available for transmission of an SRS from the wireless device 10 is mapped to particular feedback information. One of the radio resources that may be available for transmission of an SRS from the wireless device 10 is cyclic shift. FIGS. 4A-4C show different cyclic shift configurations available for the SRS. FIG. 4A shows an SRS without any cyclic shift. As shown in FIG. 4A, each element of the SRS remains in serial order, from a(0) to a(n-1). FIG. 4B shows a first cyclic shift configuration for an SRS. As shown in FIG. 4B, each element of the SRS is shifted right m times, while the rightmost m elements of the SRS are shifted to the front of the sequence, where n is the number of elements in the SRS, and m is equal to n/8. FIG. 4C shows a second cyclic shift configuration for an SRS. As shown in FIG. 4C, each element of the SRS is shifted right 2 m times, while the 2 m rightmost elements of the SRS are shifted to the front of the sequence, where n is the number of elements in the SRS, and m is equal to n/8.

Each one of the aforementioned cyclic shift configurations may be mapped to different feedback information from the wireless device 10. For example, different cyclic shift configurations of the SRS may indicate different mobility statuses of the wireless device 10, such as a high mobility status, a medium mobility status, a low mobility status, or a static mobility status. As an additional example, different cyclic shift configurations of the SRS may indicate different position information for the wireless device 10, such as the angle of the wireless device relative to the base station 12. The wireless device 10 may choose a particular cyclic shift configuration for transmission of the SRS in order to convey desired feedback information to the base station 12. Although only three cyclic shift configurations for an SRS are shown in FIGS. 4A-4C, those of ordinary skill in the art will appreciate that any number of cyclic shift configurations can be used for the SRS without departing from the principles of the present disclosure.

Figure 5:
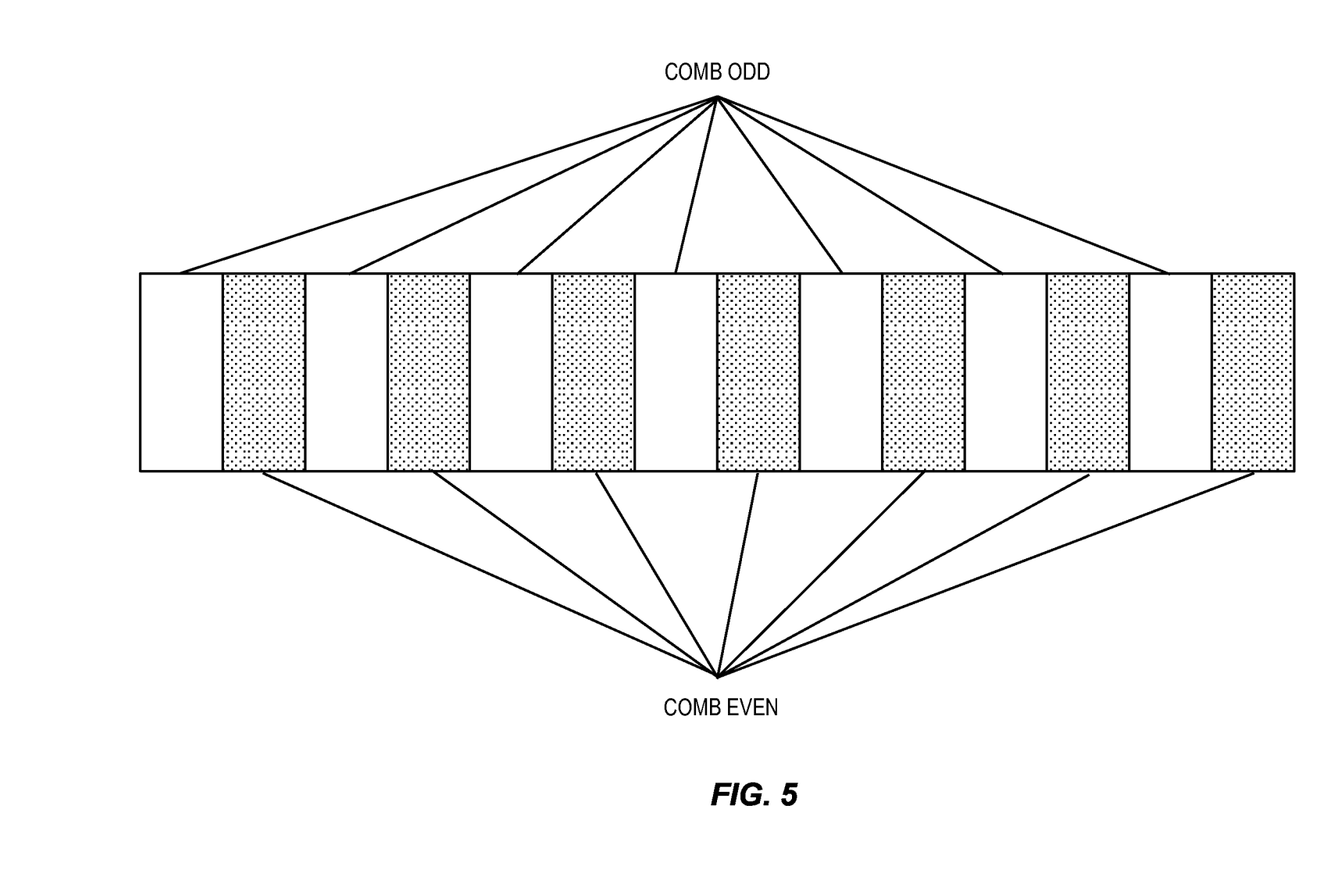
FIG. 5 is a diagram showing different comb configurations available for an uplink SRS sequence.

In addition to or as an alternative to cyclic shift, comb configuration is another resource that may be available for transmission of the uplink SRS by the wireless device 10. FIG. 5 shows two possible comb configurations for the uplink SRS signal. The first comb configuration shown in FIG. 5 is a comb odd configuration, in which a portion of the uplink SRS is transmitted on every odd subcarrier frequency during the SRS transmission period. The second comb configuration shown in FIG. 5 is a comb even configuration, in which a portion of the uplink SRS is transmitted on every even subcarrier frequency of the SRS transmission period. Each one of the aforementioned comb configurations may be mapped to different feedback information from the wireless device 10. For example, each comb configuration of the SRS may indicate a different mobility status of the wireless device 10, such as a high mobility status and a low mobility status. As an additional example, each comb configuration of the SRS may indicate position information from the wireless device 10, such as the angle of the wireless device 10 relative to the base station 12. The wireless device 10 may then choose a particular comb configuration for transmission of an SRS in order to convey desired feedback information to the base station 12.

Figure 6A:
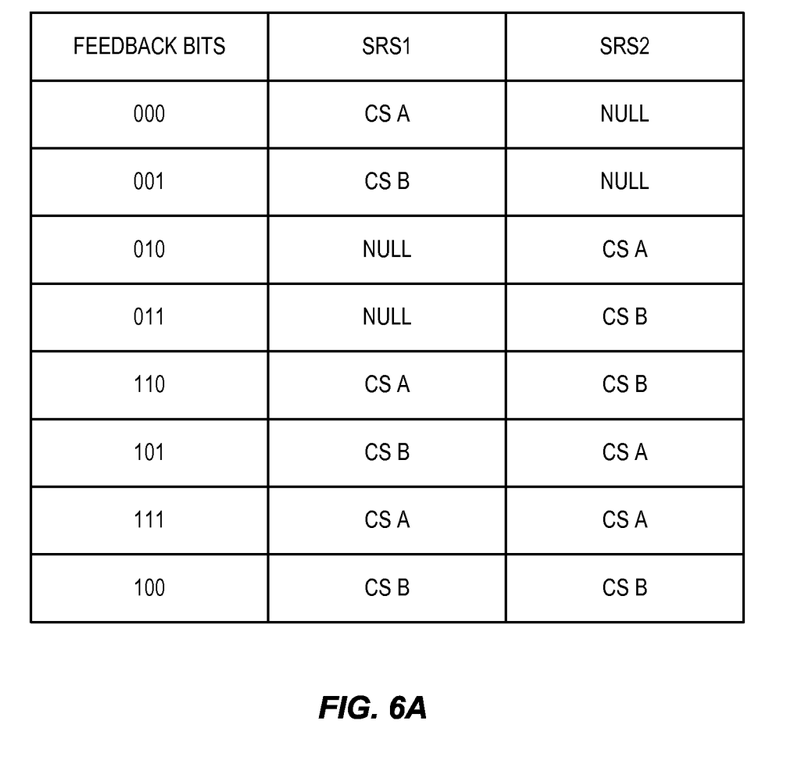
FIGS. 6A-6C are tables showing exemplary mappings between feedback information and radio resources used for an uplink reference signal according to one embodiment of the present disclosure.
Figure 6B:
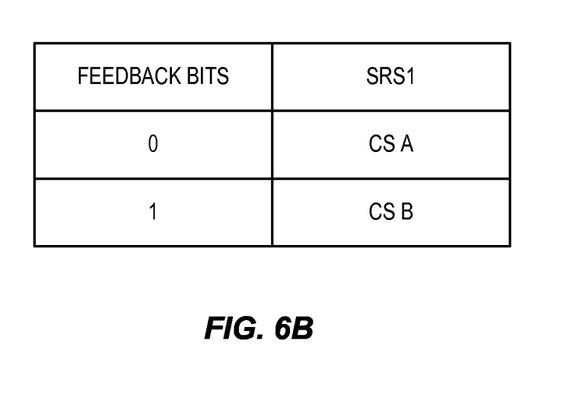
Figure 6C:
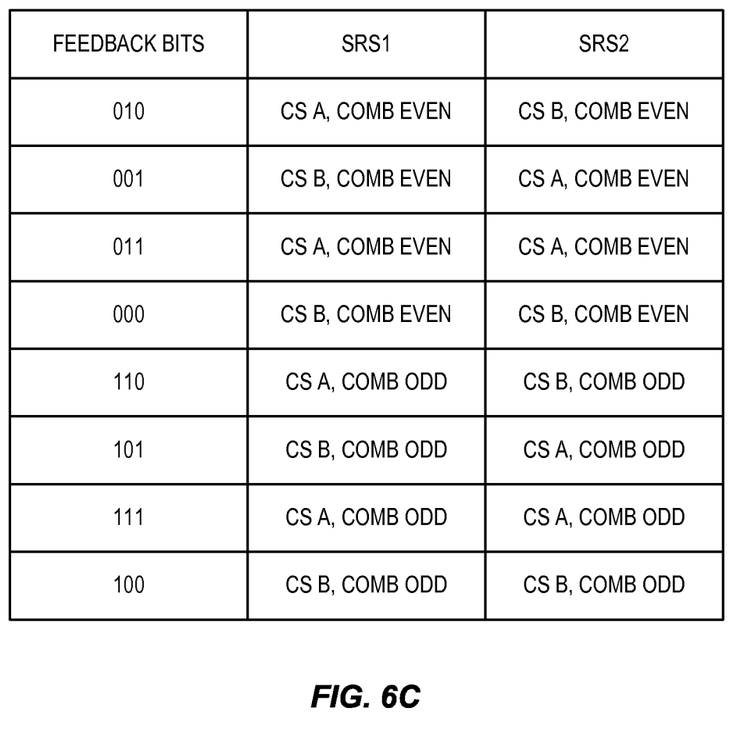

As discussed above, each one of the aforementioned radio resources may be selectively utilized across one or more SRS signal transmission slots in order to convey desired feedback information from the wireless device 10 to the base station 12. FIGS. 6A-6C are tables illustrating an exemplary mapping of available radio resources for transmission of an SRS from the wireless device 10 to feedback information. In FIG. 6A, in an LTE special subframe such as that illustrated in FIG. 3, the wireless device 10 is allocated two SRS transmission slots (SRS1 and SRS2) and two cyclic shift configurations (CS A and CS B). The first SRS transmission slot SRS1 and the second SRS transmission slot SRS2 are used along with the first cyclic shift configuration (CS A) and the second cyclic shift configuration (CS B) to convey three bits of feedback information. Specifically, the wireless device 10 transmits the uplink SRS using a select combination of SRS1, SRS2, CS A, and CS B to convey desired feedback information to the base station 12. In this example, up to eight different bit sequences may be transmitted from the wireless device 10 to the base station 12.

All, or at least some, of the eight bit sequences correspond to different feedback information from the wireless device 10. For example, some or all of the eight bit sequences may indicate a different mobility status of the wireless device 10, such as a high mobility status, a medium mobility status, a low mobility status, or a static mobility status. As an additional example, some or all of the eight bit sequences may indicate position information from the wireless device 10, such as the angle of the wireless device 10 relative to the base station 12.

In FIG. 6B, two cyclic shift configurations are used in a single SRS transmission slot to convey one bit of feedback information. Specifically, a first cyclic shift configuration (CS A) and a second cyclic shift configuration (CS B) are used to convey the feedback information. Accordingly, one bit of feedback information may be transferred from the wireless device 10 to the base station 12. Each one of the bit sequences may correspond to different feedback information from the wireless device 10, as discussed above.

In FIG. 6C, two cyclic shift configurations and two comb configurations are used along with a first SRS transmission slot SRS1 and a second SRS transmission slot SRS2 to convey three bits of feedback information. Specifically, similar to FIG. 6A, a first cyclic shift configuration (CS A), a second cyclic shift configuration (CS B), a first comb configuration (comb even) and a second comb configuration (comb odd) are selectively combined to convey up to eight different bit sequences that may be transmitted from the wireless device 10 to the base station 12. Each one of the eight bit sequences may correspond with particular feedback information from the wireless device 10, as discussed above.

Although FIGS. 6A-6C show specific mappings between radio resources available for transmission of an SRS and feedback information, those of ordinary skill in the art will appreciate that any number of available radio resources for transmission of an SRS from the wireless device 10 may be used in any configuration to convey desired feedback information between the wireless device 10 and the base station 12. Further, those of ordinary skill in the art will appreciate that additional radio resources may be combined in order to provide more robust feedback between the wireless device 10 and the base station 12.

Figure 7A:
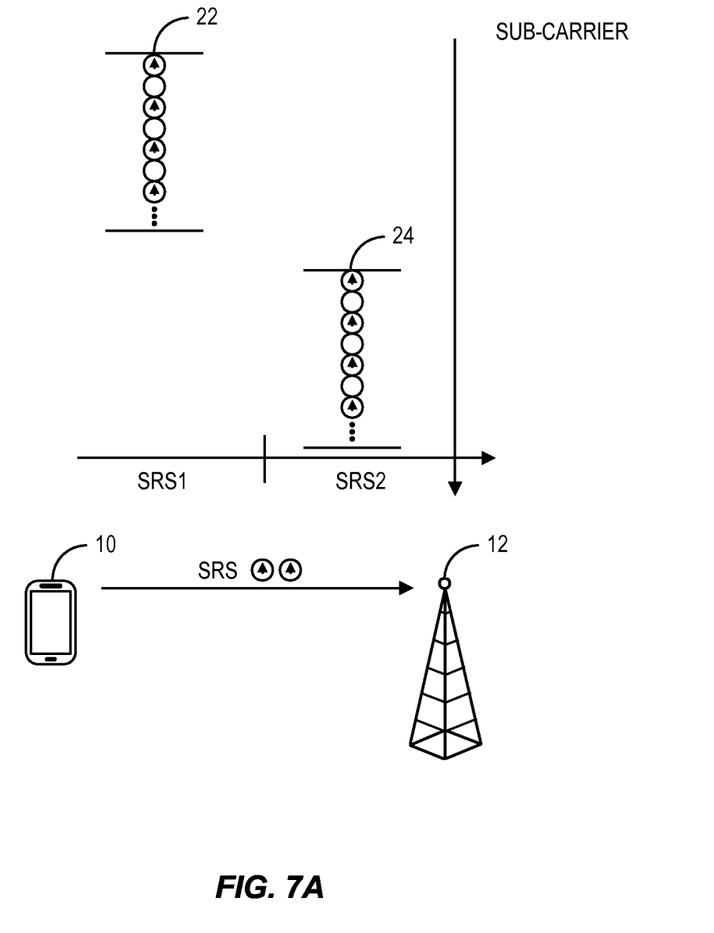
FIGS. 7A-7C are diagrams illustrating the transmission of feedback information using an uplink reference signal according to exemplary embodiments of the present disclosure.
Figure 7B:
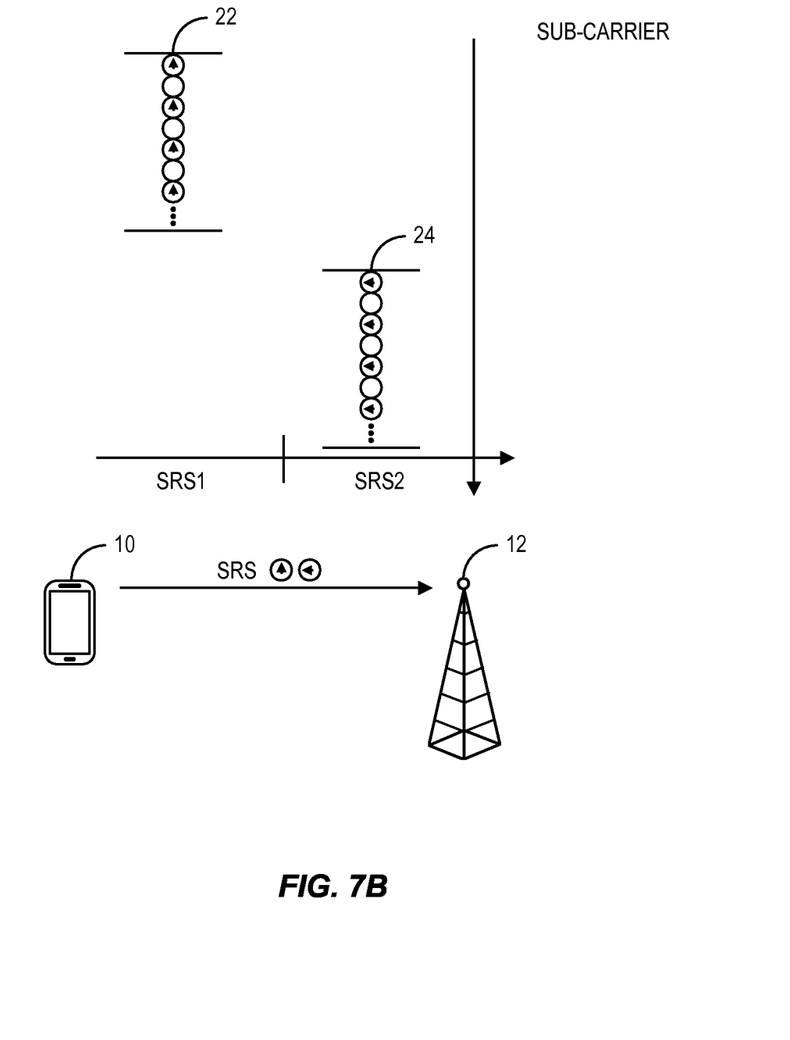
Figure 7C:
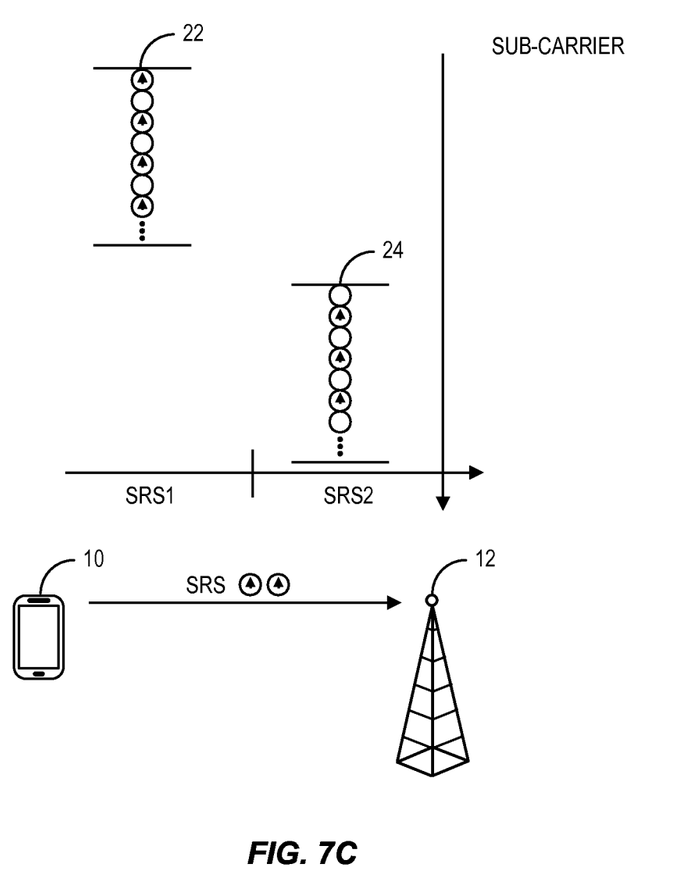

FIGS. 7A-7C are diagrams illustrating the transmission of feedback information using an SRS between a wireless device 10 and a base station 12 according to one embodiment of the present disclosure. As shown in FIG. 7A, during a first SRS transmission slot (SRS1), the wireless device 10 transmits uplink SRS in a first set of subcarriers 22 using a particular cyclic shift and comb configuration. During a second SRS transmission slot (SRS2), the wireless device 10 transmits uplink SRS in a second set of subcarriers 24 using the same cyclic shift and comb configuration. Using the mapping shown in FIG. 6A as an example, the radio resources used for transmission of the uplink SRS may be mapped to a bit sequence of 111 (CS A in both SRS1 and SRS2). However, note that the set of subcarriers used may also be a resource included in the mapping.

FIG. 7B is substantially similar to FIG. 7A, except that different cyclic shift configurations are used in the two SRS transmission slots (SRS1 and SRS2). As such, different feedback information is conveyed to the base station according to the resource to feedback information mapping.

FIG. 7C is substantially similar to FIGS. 7A and 7B, except that different comb configurations are used in the two SRS transmission slots (SRS1 and SRS2). As such, different feedback information is conveyed to the base station 12 according to the resource to feedback information mapping used.

As illustrated in FIGS. 7A-7C, by choosing the radio resources used to transmit the uplink SRS from the wireless device 10 to the base station 12, the wireless device 10 conveys different feedback information to the base station 12. Further, the feedback information may change over time. For example, the wireless device 10 may update the base station 12 based on changes to the mobility status or position of the wireless device 10.

Figure 8A:
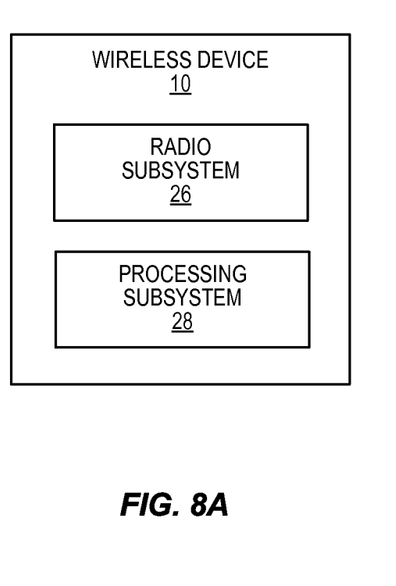
FIGS. 8A and 8B are block diagrams showing details of the wireless device and the base station according to one embodiment of the present disclosure.

FIG. 8A is a block diagram of the wireless device 10 according to one embodiment of the present disclosure. As illustrated, the wireless device 10 includes a radio subsystem 26 and a processing subsystem 28. The radio subsystem 26 usually includes analog and, in some embodiments, digital components for wirelessly sending and receiving data to and from other devices in a cellular communications network. In particular embodiments, the radio subsystem 26 includes a transmitter and a receiver, which are capable of transmitting suitable information wirelessly to and receiving suitable information from other network nodes. From a wireless communications protocol view, the radio subsystem 26 implements at least part of Layer 1 (i.e., the Physical or "PHY" layer).

The processing subsystem 28 generally implements any remaining portion of Layer 1 not implemented in the radio subsystem 26 as well as functions for higher layers in the wireless communications protocol (e.g., Layer 2 (data link layer), Layer 3 (network layer), etc.). In particular embodiments, the processing subsystem 28 may comprise, for example, one or several general-purpose or special-purpose microprocessors or other microcontrollers programmed with suitable software and/or firmware to carry out some or all of the functionality of the wireless device 10 described herein. In addition to or alternatively, the processing subsystem 28 may comprise various digital hardware blocks (e.g., one or more Application Specific Integrated Circuits (ASICs), one or more off-the-shelf digital and analog hardware components, or a combination thereof) configured to carry out some or all of the functionality of the wireless device 10 described herein. Additionally, the above described functionality of the wireless device 10 may be implemented, in whole or in part, by the processing subsystem 28 executing software or other instructions stored on a non-transitory computer-readable medium, such as RAM, ROM, a magnetic storage device, an optical storage device, or any other suitable type of data storage components.

Figure 8B:
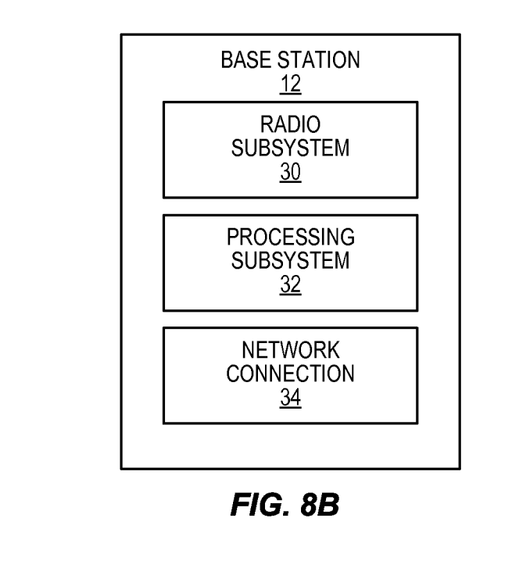

FIG. 8B is a block diagram of the base station 12 according to one embodiment of the present disclosure. As illustrated, the wireless device 10 includes a radio subsystem 30, a processing subsystem 32, and a network interface 34. The radio subsystem 30 usually includes analog and, in some embodiments, digital components for wirelessly sending and receiving data to and from other devices in a cellular communications network. In particular, embodiments, the radio subsystem 30 includes a transmitter and a receiver, which are capable of transmitting suitable information wirelessly to and receiving suitable information from other network nodes. From a wireless communications protocol view, the radio subsystem 30 implements at least part of Layer 1 (i.e., the Physical or "PHY" layer).

The processing subsystem 32 generally implements any remaining portion of Layer 1 not implemented in the radio subsystem 30 as well as functions for higher layers in the wireless communications protocol (e.g., Layer 2 (data link layer), Layer 3 (network layer), etc.). In particular embodiments, the processing subsystem 32 may comprise, for example, one or several general-purpose or special-purpose microprocessors or other microcontrollers programmed with suitable software and/or firmware to carry out some or all of the functionality of the base station 12 described herein. In addition to or alternatively, the processing subsystem 32 may comprise various digital hardware blocks (e.g., one or more ASICs, one or more off-the-shelf digital and analog hardware components, or a combination thereof) configured to carry out some or all of the functionality of the base station 12 described herein. Additionally, the above described functionality of the base station 12 may be implemented, in whole or in part, by the processing subsystem 32 executing software or other instructions stored on a non-transitory computer-readable medium, such as RAM, ROM, a magnetic storage device, an optical storage device, or any other suitable type of data storage components. Lastly, the base station 12 includes the network interface 34 that provides a connection, which is preferably wired, to a network. The network may be the core network of an associated cellular communications network or a public or private network through which the base station 12 is capable of connecting to the associated cellular communications network.

The following acronyms are used throughout this disclosure.

ACK Acknowledge Message
ASIC Application Specific Integrated Circuit
CoMP Coordinated Multipoint
CQI Channel Quality Indicator
CS Cyclic Shift
CSI Channel State Information
DwPTS Downlink Pilot Time Slot
eNB Enhanced Node B
GP Guard Period
HARQ Hybrid Automatic Repeat Request
LTE Long Term Evolution
MIMO Multiple-Input/Multiple-Output
NACK Negative Acknowledge Message
PMI Pre-coding Matrix Indicator
PUCCH Physical Uplink Control Channel
PUSCH Physical Uplink Shared Channel
RI Rank Indicator
RRC Radio Resource Control
SRS Sounding Reference Signal
TDD Time Division Duplex
TTI Transmission Time Interval
UpPTS Uplink Pilot Time Slot Those skilled in the art will recognize improvements and modifications to the preferred embodiments of the present disclosure. All such improvements and modifications are considered within the scope of the concepts disclosed herein and the claims that follow.

What is claimed is:

1. A wireless device comprising:
   a radio subsystem; and
   a processing subsystem associated with the radio subsystem and configured to:
      select one of a plurality of sets of radio resources for transmission of an uplink reference signal wherein each of the plurality of sets of radio resources comprises at least one of the group consisting of a cyclic shift, a time resource, and a frequency resource, wherein the selected one of the plurality of sets of radio resources is mapped to feedback information that the wireless device desires to convey to a base station and each of the plurality of sets of radio resources is mapped to different feedback information; and
      transmit the uplink reference signal to the base station via the radio subsystem using the selected one of the plurality of sets of radio resources to thereby convey the feedback information to the base station.

2. The wireless device of claim 1 wherein the uplink reference signal is an uplink sounding reference signal for an orthogonal frequency-division multiplexing, OFDM, based network.

3. The wireless device of claim 2 wherein the OFDM based network is one of a long term evolution, LTE, network, an LTE-Advanced network, or an LTE evolutionary network.

4. The wireless device of claim 1 wherein the feedback information comprises a mobility status of the wireless device.

5. The wireless device of claim 4 wherein the mobility status indicates one of a high mobility status, a medium mobility status, a low mobility status, or a static mobility status.

6. The wireless device of claim 1 wherein the feedback information comprises position information for the wireless device.

7. The wireless device of claim 6 wherein the position information indicates an angle of movement of the wireless device relative to the base station.

8. The wireless device of claim 1 wherein the radio subsystem is configured to receive information indicative of the plurality of sets of radio resources for the uplink reference signal being allocated to the wireless device from the base station, each one of the plurality of sets of radio resources being mapped to different feedback information.

9. The wireless device of claim 3 wherein the radio subsystem is configured to receive information indicative of the plurality of sets of radio resources for the uplink reference signal being allocated to the wireless device from the base station, each one of the plurality of sets of radio resources being mapped to different feedback information.

10. A base station for a cellular communications network comprising:
    a radio subsystem; and
    a processing subsystem associated with the radio subsystem and configured to receive an uplink reference signal from a wireless device and derive feedback information from the wireless device based on one of a plurality of sets of radio resources allocated to the wireless device used by the uplink reference signal wherein each of the plurality of sets of radio resources comprises at least one of the group consisting of a cyclic shift, a time resource, and a frequency resource, and further wherein each of the plurality of sets of radio resources is mapped to different feedback information.

11. The base station of claim 10 wherein the uplink reference symbol is an uplink sounding reference signal for an orthogonal frequency-division multiplexing, OFDM, based network.

12. The base station of claim 11 wherein the OFDM based network is one of a long term evolution, LTE, network, an LTE-Advanced network, or an LTE evolutionary network.

13. The base station of claim 10 wherein the feedback information comprises a mobility status of the wireless device.

14. The base station of claim 13 wherein the mobility status indicates one of a high mobility status, a medium mobility status, a low mobility status, or a static mobility status.

15. The base station of claim 10 wherein the feedback information comprises position information from the wireless device.

16. The base station of claim 15 wherein the position information indicates an angle of movement of the wireless device relative to the base station.

17. The base station of claim 10 wherein the processing subsystem is further configured to transmit information indicative of the plurality of sets of radio resources allocated to the wireless device by the base station via the radio subsystem, each of the plurality of sets of radio resources being mapped to different feedback information.

18. The base station of claim 12 wherein the processing subsystem is further configured to transmit information indicative of the plurality of sets of radio resources allocated to the wireless device by the base station via the radio subsystem, each of the plurality of sets of radio resources being mapped to different feedback information.

19. A method of operation of a base station comprising:
receiving an uplink reference signal from a wireless device; and
detecting feedback information from the wireless device based on one of a plurality of sets of radio resources allocated to the wireless device used by the uplink reference signal wherein each of the plurality of sets of radio resources comprises at least one of the group consisting of a cyclic shift, a time resource, and a frequency resource, and further wherein each of the plurality of sets of radio resources is mapped to different feedback information.

20. The method of claim 19 wherein the uplink reference signal is an uplink sounding reference signal for an orthogonal frequency-division multiplexing, OFDM, based network.

21. The method of claim 20 wherein the OFDM based network is one of a long term evolution, LTE, network, an LTE-Advanced network, or an LTE evolutionary network.

22. The method of claim 19 wherein the feedback information comprises a mobility status of the wireless device.

23. The method of claim 22 wherein the mobility status indicates one of a high mobility status, a medium mobility status, a low mobility status, or a static mobility status.

24. The method of claim 19 wherein the feedback information comprises position information about the wireless device.

25. The method of claim 24 wherein the position information indicates an angle of movement of the wireless device relative to the base station.

26. The method of claim 19 further comprising transmitting information indicative of the plurality of radio sets of resources allocated to the wireless device from the base station, wherein each of the plurality of sets of radio resources is mapped to different feedback information.

27. The method of claim 21 further comprising transmitting information indicative of the plurality of sets of radio resources allocated to the wireless device from the base station, wherein each of the plurality of sets of radio resources is mapped to different feedback information.

28. A method of operation of a wireless device comprising:
selecting one of a plurality of sets of radio resources for transmission of an uplink reference signal wherein each of the plurality of sets of radio resources comprises at least one of the group consisting of a cyclic shift, a time resource, and a frequency resource, wherein the selected one of the plurality of sets of radio resources is mapped to feedback information that the wireless device desires to convey to a base station and each of the plurality of sets of radio resources is mapped to different feedback information; and
transmitting the uplink reference signal to the base station using the selected one of the plurality of sets of radio resources to thereby convey the feedback information to the base station.

29. The method of claim 28 wherein the uplink reference signal is a sounding reference signal for an orthogonal frequency-division multiplexing, OFDM, based network.

30. The method of claim 29 wherein the OFDM based network is one of a long term evolution, LTE, network, an LTE-Advanced network, or an LTE evolutionary network.

31. The method of claim 28 wherein the feedback information comprises a mobility status of the wireless device.

32. The method of claim 31 wherein the mobility status indicates one of a high mobility status, a medium mobility status, a low mobility status, or a static mobility status.

33. The method of claim 28 wherein the feedback information comprises position information about the wireless device.

34. The method of claim 33 wherein the position information indicates an angle of movement of the wireless device relative to the base station.

35. The method of claim 28 further comprising receiving information indicative of the plurality of sets of radio resources for the uplink reference signal being allocated to the wireless device from the base station, each one of the plurality of sets of radio resources being mapped to different feedback information.

36. The method of claim 30 further comprising receiving information indicative of the plurality of sets of radio resources for the uplink reference signal being allocated to the wireless device from the base station, each of the plurality of sets of radio resources being mapped to different feedback information.

37. The wireless device of claim 1 wherein each of the plurality of sets of radio resources comprises a cyclic shift.

38. The wireless device of claim 1 wherein each of the plurality of sets of radio resources comprises a time resource.

39. The wireless device of claim 1 wherein each of the plurality of sets of radio resources comprises a frequency resource.

* * * * *